3,343,964
CEREAL PRODUCTS HAVING INCORPORATED THEREIN ALKALI SALTS OF MONOALKYL FUMARATES AND MALEATES
Paul D. Thomas, Groton, Conn., assignor to Chas. Pfizer & Co., Inc., New York, N.Y., a corporation of Delaware
No Drawing. Filed Aug. 21, 1964, Ser. No. 391,080
13 Claims. (Cl. 99—80)

The present application is a continuation-in-part of copending application Ser. No. 306,277, filed September 3, 1963, now abandoned.

This invention relates to certain novel starch compositions. More particularly, it is concerned with certain useful salts of various half-acid organic esters which have been found to be of value in industry when used in conjunction with starch. The invention includes the use of these salts as well as the compositions containing them within its scope.

In the baking art, natural variations in flour characteristics have been the source of a continuous problem or obstacle to the workers in this field even when flours of the highest quality grade are carefully selected. Long a problem in conventional baking, this matter has now been further accentuated in continuous bread processing. In accordance with the present invention, on the other hand, the compounds disclosed and used herein help to even out variations in flour characteristics in view of the marked dough strengthening properties which they exhibit. As a result, greater tolerances are now provided in the mixing, fermenting and machining operations, causing a baked product to be obtained with improved grain and texture as well as over-all quality. In addition, the rate of crumb firming is retarded and there is also no need to use such emulsifiers as mono-diglycerides and calcium stearyl-2-lactylate, etc.

The compounds which are included within the purview of this invention are all selected from the group consisting of the monoalkali and alkaline-earth metal salts of maleic and fumaric half-acid esters having the following formulae:

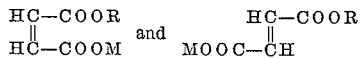

wherein R is an alkyl radical of from fourteen to eighteen carbon atoms, and M is a metallic cation selected from the group consisting of sodium, potassium, calcium and magnesium. Typical member compounds of this series include sodium monostearyl fumarate, calcium monostearyl fumarate, sodium monostearyl maleate, sodium monocetyl fumarate, potassium monostearyl fumarate, magnesium monotetradecyl maleate, calcium monocetyl fumarate, and the like. All these compounds are useful as bread softening agents in view of their ability to retard the firming of bread when incorporated into the dough of the baking mix prior to baking.

The process employed for preparing the novel compounds of this invention involves the following steps starting from maleic anhydride: (1) The formation of the monoalkyl acid maleate ester from the aforementioned anhydride by treatment of the latter with an equivalent amount of the desired alkanol having the requisite number of carbon atoms; (2) the production of the sodium, potassium, calcium or magnesium salt of the aforementioned half-acid ester by conventional procedure; and (3) the conversion or isomerization of said salt or of the half-acid ester itself to the corresponding fumarate compound by standard catalytic means. Needless to say, if the half-acid maleate ester rather than the salt itself is converted to the fumarate compound, then the desired salt compounds can be subsequently obtained therefrom, i.e., from the corresponding half-acid fumarate ester, in accordance with the usual conventional procedure.

Alternatively, it is also possible to prepare the desired compounds of this invention from the appropriate dicarboxylic acid starting materials by simply using a method which involves classical esterification and selective monosaponification procedures. More specifically, the two steps of this method involve first treating the organic acid with at least a dimolar amount of the desired alkanol to form the corresponding diester, and then subjecting the dialkyl ester so formed to the selective action of one equivalent amount of sodium, potassium or calcium hydroxide, as the case may be, in an aqueous system to yield the corresponding salt of the half-acid ester. Needless to say, in the case of both routes, if the alkali metal salt is the compound which is formed first, then the corresponding calcium or magnesium compound may be subsequently prepared therefrom by means of a simple metathetical reaction.

In connection with a more detailed consideration of one of the preferred routes of synthesis for these compounds, maleic anhydride is first reacted with the desired higher alkanol of choice in the presence of a reaction-inert organic solvent medium under substantially anhydrous conditions. This usually entails carrying out the reaction in an aromatic hydrocarbon solvent such as benzene, toluene, xylene, and the like, and employing a nitrogen atmosphere or similar conditions in order to ensure completeness of reaction. In general, only equimolar amounts of reactant and reagent need be employed here and the reaction is ordinarily conducted at the reflux temperature of the reaction mixture for the sake of both time and convenience, although any temperature in the range of from about 40° C. up to about the boiling point of the solvent will be found to be most satisfactory for the purposes at hand (this will set the upper limit of the temperature range in the neighborhood of 140° C. when xylene is used). A time period of from about one-half to about ten hours will ordinarily suffice under these conditions. Upon cooling the spent reaction mixture down to room temperature, crystals of the desired half-acid ester of maleic acid soon separate therefrom and they can subsequently be collected by such means as suction filtration and the like.

The conversion or isomerization of the half-acid ester of maleic acid thus produced to the corresponding fumarate compound is then effected by any number of standard procedures using a halogen as catalyst and preferably by the method which involves treating said maleate ester with bromine as actalyst in the presence of a minor amount of 2,2-azabis(2'-methylpropionitrile). This particular reaction is ordinarily conducted in a halogenated hydrocarbon solvent such as methylene chloride, ethylene dichloride, trichlorethylene, chloroform, S-tetrachlorethane and carbon tetrachloride, etc., and generally, at the reflux temperature of the mixture, although any temperature in the range of from about 30° C. up to about the boiling point of the solvent will suffice (this will set the upper limit of the temperature range in the neighborhood of 145° C. when S-tetrachlorethane is used). A time period of from about one-half to about 7.5 hours will ordinarily be most satisfactory for the purposes at hand. Upon completion of this step, the desired monoalkyl acid fumarate ester is recovered from the reaction mixture in the form of a crystalline precipitate.

Finally, the production of the desired monoalkali and calcium and magnesium salts of these compounds from the aforementioned half-acid esters themselves can then be effected by any number of conventional procedures in the art using first the desired alkali metal or calcium hydroxide as reagent in an aqueous system. In practice, it is preferable to employ an aqueous alcoholic or aqueous acetone solution of the half-acid ester compound containing an equivalent amount in moles of the appropriate metal hydroxide. The desired salt soon precipitates from solution almost immediately upon completion of this step. Other solvents which may be used in place of acetone in this connection include other lower alkyl ketones such as methyl ethyl ketone, diethyl ketone, methyl isoamyl ketone, and the like, while suitable alcohol solvents include such lower alkanols as methanol, ethanol, isopropanol, tertiary-butanol and tertiary-amyl alcohol, etc. The calcium monoalkyl maleates and/or fumarates may, alternatively, also be prepared from the corresponding monoalkali compounds thus formed, as are the magnesium compounds, by means of a simple metathetical reaction involving the use of an appropriate alkaline-earth metal halide, such as calcium chloride or magnesium bromide, in an aqueous system to yield the desired calcium or magnesium salt, as the case may be.

As previously indicated, the compounds of this invention are all useful as bread softening agents to prevent staling, in addition to being useful in improving the condition of the dough as well. In carrying out the baking process proper, only minor proportionate amounts of the instantly claimed compounds need be used in the dough batch or baking mix in order to achieve effective results in this connection. For instance, concentrations as low as 0.1% by weight of the compound, based on the weight of the flour have been found to be effective and, in general, one need only employ these compounds at levels that are in the range of from about 0.1% up to about 1.5% by weight of the softening agent in order for highly satisfactory results to be achieved. Moreover, the sodium, potassium, calcium and magnesium salts of the maleic and fumaric half-acid esters of this invention accomplish their useful firmness-retarding activity in bread without causing any adverse side effects to occur, i.e., they do not adversely affect the crumb size, grain, crust, color, texture, specific volume or flavor of the finished bread products when the latter are baked under normal, standard conditions. The bread-softening activity of these compounds is also surprising when one considers that the corresponding half-acid esters from which they are derived lack this activity to a substantial degree.

Additionally, the compounds of this invention impart improved qualities in general, including anti-staling properties, to such baked products as rolls, doughnuts, biscuits, cakes, pastries and the like, as well as bread, when added to the dough in the quantities previously indicated. For instance, among the specific advantages which have been realized by their use in this manner with respect to the yeast-leavened products are: (1) Retardation of crumb firming; (2) improved dough handling characteristics; (3) improved ingredient and processing tolerances; (4) reduction in proof time; and (5) improved physical characteristics, such as the grain, texture and volume of the finished baked products. Furthermore, chemically-leavened baked goods also benefit equally as well by the use of these compounds in the baking dough or batter prior to baking in the same manner as before. Thus, for example, improved batter and/or dough handling characteristics have resulted, as well as improved finished goods properties and firmness development with respect to the crumb quality. In almost every case, the most outstanding compound of all those tested and the one which is, therefore, the most preferred member of this invention is sodium monostearyl fumarate.

Moreover, the compounds of the present invention are useful in starch products in the food field in general. For instance, they have been found to impart improved properties to the quality and texture of such products as cereals, macaroni and the like, if said products are first treated with these compounds just prior to cooking. The advantages afforded by the use of these compounds in this manner (as applied to starch-based foods) are manifold: for instance, they prevent undesirable stickiness and pastiness from occurring in said products, thereby resulting in increased production advantages as well as in increased consumer appeal of the finished product. Examples of practical illustrations of the present invention include the use of these compounds in such starch-based foods as instant potato flakes or granules, macaroni products and spaghetti, hot breakfast food cereals, and starch-based pie-fillings and dessert puddings, as well as in dehydrated creamed soups, various rice products, and the like. In each case, the starch-containing product is improved as to both its quality and texture in view of the ability of these compounds to reduce the inherent stickiness and pastiness of the starch-containing food material as previously indicated.

In accordance with the process of this invention for effecting said improvement in starch-based foods, a starch-containing or starch-based food material is first treated with a relatively minor amount of the organic compound heretofore mentioned just prior to the cooking step. In general, all that is usually necessary is to use at least about 0.1% by weight of the compound based on the total weight of the starch-based food material. In some instances, even less than this amount may be effective, but it is generally not advisable to go below the aforementioned lower limit. The upper limit can be preferably set at about 4% although this is not really critical and amounts as high as 6% by weight have been used. Nevertheless, there is no real appreciable advantage to be gained in exceeding the aforementioned 4% weight limit. The important point to remember is that the addition and subsequent mixing steps must be accomplished prior to the cooking of the starch-based food material. Of especial interest in this connection is the fact that sodium monostearyl fumarate has been found to be particularly valuable as an agent for improving the quality and texture of macaroni products. For instance, this compound has been found to increase firmness of the food product itself, as well as to improve its tolerance to overcooking and prevent clinging and stickiness of the individual noodle strands. These improved properties of the finished food material are of especial value in those cases where the macaroni product is intended for use in the canning industries and in the institutional trades, such as in mass feeding establishments, etc.

Additional industrial applications for these compounds lie in the non-food area where starch is also involved as a key ingredient. For instance, these compounds allow for a higher starch solids concentration at useful viscosity ranges or conversely, provide lower viscosities at equivalent starch solids concentrations. They also allow for a facilitation in the handling of starch pastes and, for the stabilization of same with respect to viscosity and uniformity, particularly at elevated temperatures. The tendency toward solids deposition from the pastes is also reduced, i.e., retrogradation is inhibited. All these properties are of value in using the present compounds in conjunction with starch to prepare pharmaceutical tablets, gums, jellies, confections and the like, as well as in paper and textile sizing, and starch manufacture. With regard to those industrial applications that are not intended primarily for oral human consumption as their end use, sodium monostearyl maleate is the preferred compound of choice in view of the economics involved. However, other preferred compounds which may be used for these purposes include sodium monocetyl fumarate, sodium monocetyl maleate, and sodium monostearyl fumarate.

More specifically, the compounds of this invention have been found to inhibit gelation in starches when they are added to the pastes containing same at low temperatures, i.e., just prior to gelation. This addition must be made at, at least, about the 0.1% concentration level, based on starch. On the other hand, when added to the pastes that have already gelled these compounds cause an increase in viscosity, with the latter effect being particularly true in wheat, corn and rice starch. For instance, when sodium monostearyl fumarate was added to the initial starch paste at room temperature, it was found to inhibit starch granule swelling in the paste as evidenced by lowered paste viscosities. However, when added to a gel that had already reached maximum viscosity, its effect was to increase the viscosity beyond that point, i.e., above that of the control maximum. As previously indicated, the gelation effect was quite dramatic in the case of wheat starch, corn starch and rice starch when sodium monostearyl fumarate was added to their pastes at room temperature at a 2% concentration level based on starch weight, followed by a heating cycle. Furthermore, in flour all these compounds exert an almost equal but yet different effect on both the starch and gluten fractions. For instance, starch granule swelling is retarded same as before, while the gluten structure is strengthened. This effect on gluten takes place at non-elevated temperatures, since in doughs prepared at room temperature, the gluten strengthening effect was observed. On the other hand, the effect on starch appears to take place only at higher temperatures, i.e., at temperatures above about 50° C.

In summary, therefore, the present invention is concerned with compositions comprising starch and at least about 0.1% by weight based on said starch of a substance selected from the group consisting of the sodium, potassium, calcium and magnesium salts of monoalkyl fumarates and maleates containing from about 14 to 18 carbon atoms in the alkyl group. These compositions have film-forming, thickening and starch-adhesive properties. More particularly, it is concerned with food compositions comprising an edible starch and from about 0.1 to 4% by weight based on said starch of a substance as hereinbefore described. The preferred compounds for the food compositions are the fumarates of from 16 to 18 carbon atoms in the alkyl group and especially, sodium monostearyl fumarate and sodium monocetyl fumarate. The starch present in these compositions can be in the form of a cereal grain like wheat, rice, maize, oats and barley, etc. Within this scope lie such compositions wherein the cereal grain is a cooked breakfast cereal or a cereal flour. In the latter category, we wish to specifically include such products as alimentary paste products like macaroni, spaghetti and noodles, and products where the cereal flour composition is in the form of a baked dough. These dough compositions, of course, must contain yeast or else a chemical leavening agent like tartaric acid—sodium bicarbonate, for example. The baked leavened dough products so produced, of course, also fall within the scope of this invention.

Moreover, the invention also includes within its scope the method of improving the properties of aqueous starch dispersions, which comprises the step of incorporating therein at least about 0.1% by weight based on said starch of the substance heretofore mentioned, i.e., a substance selected from the group consisting of the sodium, potassium, calcium and magnesium salts of monoalkyl fumarates and maleates containing from about 14 to 18 carbon atoms in the alkyl group. More particularly, it is concerned with the method of reducing stickiness in water-containing cereal grain products by incorporating these compounds within said compositions at concentration levels ranging from about 0.1 to about 4% by weight based on the weight of said cereal grain. It is also concerned with the method of increasing the strength of various moisture-containing cereal flour compositions and with the method of retarding the firming rate of various baked leavened flour products. Both these methods are accomplished by incorporating the compounds of the present invention in said compositions at concentration levels ranging from about 0.1 to 2% by weight based on the weight of said flour. As previously indicated, the preferred compounds for these edible compositions are the fumarates containing from 16 to 18 carbon atoms in the alkyl group.

This invention is further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

In a 2000 ml. three-necked, round-bottomed flask equipped with mechanical stirrer, thermometer, nitrogen-capillary tube and reflux condenser fitted with a drying tube, there were placed 196 g. (2.0 moles) of maleic anhydride and 540 g. (2.0 moles) of stearyl alcohol suspended in 1000 ml. of toluene. The resulting mixture was then warmed to effect solution and refluxed for two hours thereafter while under a nitrogen atmosphere. The resulting clear, light yellow solution was then cooled in an ice-water bath, whereupon colorless crystals of monostearyl maleate soon precipitated. The crystals so obtained were subsequently collected on a filter funnel, washed with toluene and then dried in a vacuum oven at 50° C. In this manner, there were obtained 574.3 g. of product, melting at 80–81° C., in the form of brilliant colorless plates. A second crop of crystals was obtained by merely concentrating and cooling the mother liquors to afford 56.1 g. of additional product melting at 78° C. The combined yield of monostearyl maleate amounted to 86% of the theoretical.

*Example II*

The procedure described in Example I is followed to prepare other maleate monoester compounds by merely employing the appropriate aliphatic alcohol in place of stearyl alcohol on an equivalent molar basis in each case. The compounds specifically prepared by this method are monocetyl maleate and monotetradecyl maleate, respectively.

*Example III*

In a 2000 ml. three-necked, round bottomed flask equipped with stirrer, dropping funnel and reflux condenser fitted with a drying tube, there were placed 600 g. of monostearyl maleate dissolved in 1300 ml. of warm carbon tetrachloride. Six grams of 2,2′-azabis(2′-methylpropionitrile) were then added and the resulting solution was heated to reflux, while 5.2 g. of bromine in 400 ml. of carbon tetrachloride were subsequently added thereto from a dropping funnel at such a rate that 14 ml. of added solution were consumed per minute. This addition was completed during the course of a 30-minute period. At the end of this time, the reaction mixture was refluxed for an additional 45 minutes and then cooled to room temperature. The white precipitate which formed at this point was subsequently collected by means of vacuum filtration, washed with carbon tetrachloride on the filter funnel and dried in vacuo at 45° C. In this manner, there were obtained 508.5 g. (85%) of monostearyl fumarate, M.P. 93–94° C.

*Analysis*—Calcd. for $C_{22}H_{40}O_4$: Saponification no., 184; neut. equiv., 368. Found: Saponification no., 182; neut. equiv., 368.

*Example IV*

The procedure described in Example III is followed to prepare other fumarate monoesters by merely employing the appropriate maleate monoester (these are reported in Example II) in each case as starting material for the reaction in place of the monostearyl maleate. The compounds specifically prepared in this manner are monocetyl fumarate and monotetradecyl fumarate, respectively.

Example V

Four-hundred and forty grams (440 g., 1.20 moles) of monostearyl fumarate were dissolved in 2.5 liters of acetone in a four-liter beaker with warming and stirring. The resulting solution was then cooled to 45–50° C. and a solution of 49.5 g. (1.20 moles) of sodium hydroxide in 450 ml. of water was slowly added thereto. Upon the completion of this step, the reaction mixture was cooled in an ice-water bath to 10° C., filtered and the resulting filter cake washed with acetone and dried in a vacuum over at 50° C. In this manner, there were obtained 474 g. (99%) of sodium monostearyl fumarate.

*Analysis.*—Calcd. for $C_{22}H_{39}O_4Na$: C, 67.66; H, 10.01; saponification no., 391. Found: C, 67.25; H, 9.91; saponification no., 397.

Example VI

The procedure described in Example V is followed to prepare other monosodium salts, viz., the salts of those acids previously reported in Example I–II and IV. In each and every case, equimolar quantities of reactants and reagents are employed as in Example V. In this manner, the following compounds are obtained:

Sodium monocetyl maleate.
Sodium monocetyl fumarate.
Sodium monostearyl maleate.
Sodium monotetradecyl maleate.
Sodium monotetradecyl fumarate.

Example VII

The procedure described in Example V is followed to prepare the potassium and calcium salts of the acids previously reported in Examples I–III and IV. This is accomplished by employing potassium and calcium hydroxide, respectively, in place of sodium hydroxide on an equivalent molar basis in this reaction. The compounds obtained in this manner are listed below as follows:

Potassium monostearyl maleate.
Potassium monostearyl fumarate.
Calcium monostearyl maleate.
Calcium monostearyl fumarate.
Potassium monocetyl maleate.
Potassium monocetyl fumarate.
Calcium monocetyl maleate.
Calcium monocetyl fumarate.
Potassium monotetradecyl maleate.
Potassium monotetradecyl fumarate.
Calcium monotetradecyl maleate.
Calcium monotetradecyl fumarate.

Example VIII

Two hundred grams (200 g., 0.511 mole) of sodium monostearyl fumarate were placed in 2.5 liters of water in a four-liter beaker. The resulting slurry was then heated on the steam bath until the sodium salt had thoroughly dissolved. To the resulting hot aqueous solution, there was then added an aqueous solution consisting of 35 g. of anhydrous calcium chloride dissolved in 250 ml. of water. The resulting precipitate was filtered while hot, washed with cold water and then with acetone, and allowed to dry in the vacuum oven at 50° C. In this manner, there were obtained 191.2 g. (96%) of calcium monostearyl fumarate.

*Analysis.*—Calcd. for $C_{22}H_{39}O_4 \cdot Ca/2$: C, 68.17; H, 10.14; Ca, 5.18. Found: C, 67.80; H, 9.97; Ca, 5.35.

Example IX

The procedure described in Example VIII is followed except that magnesium bromide is used in place of calcium chloride as the reagent of choice on the same molar basis to afford the corresponding magnesium salt, viz., magnesium monostearyl fumarate.

In like manner, other alkali metal compounds such as those reported in Examples VI–VII can be used instead of sodium monostearyl fumarate to react with the appropriate alkaline-earth metal salt and yield the corresponding calcium or magnesium monoalkyl fumarate and/or maleate, as the case may be. For instance, potassium monotetradecyl maleate reacts with calcium chloride on this basis to give calcium monotetradecyl maleate, while sodium monocetyl fumarate and magnesium chloride react to yield magnesium monocetyl fumarate. Other compounds obtained in this manner are listed below as follows:

Calcium monocetyl maleate.
Calcium monocetyl fumarate.
Magnesium monocetyl maleate.
Calcium monostearyl maleate.
Magnesium monostearyl maleate.
Calcium monotetradecyl fumarate.
Magnesium monotetradecyl maleate.
Magnesium monotetradecyl fumarate.

Example X

Sodium monostearyl fumarate, prepared as described in Example V, was used as a firmness retarder in bread (i.e., a bread softener) by incorporating it into a bread recipe having the following composition:

| 4-hour sponge: | Grams |
|---|---|
| Flour | 1120 |
| Water | 615 |
| Yeast | 40 |
| Dough conditioner [1] | 8 |

[1] Potassium bromate, 0.3%; ammonium chloride, 9.7%; calcium sulfate, 25%; sodium chloride, 10%; and starch, 55%.

| Dough portion: | Grams |
|---|---|
| Flour | 480 |
| Water | 417 |
| Sugar (granulated) | 128 |
| Salt | 34 |
| Calcium propionate | 6 |
| Milk powder | 48 |
| Lard | 40 |
| Sodium monostearyl fumarate | 4 |

The ingredients of the sponge recipe are added to the McDuffee bowl of a Hobart mixer in the order listed. The ingredients are mixed for one minute using the No. 1 speed. The bowl is then scraped down and the sponge is again mixed for one minute at the No. 2 speed. The sponge is removed from the bowl at this point and transferred to a polyethylene bag and allowed to ferment at room temperature (~25° C.) for four hours.

A sponge separately prepared as described in the above section is then placed in a ten quart stainless-steel Hobart mixing bowl and the balance of the ingredients are added as outlined under the dough portion of the bread recipe. The mixture is mixed on No. 1 speed for eight minutes. The resultant dough is then removed from the bowl and placed in a polyethylene bag and allowed to ferment for 24 minutes at room temperature (~25° C.). It is then scaled into 1 lb. portions (prepared at least four 1 lb. balls of dough for the subsequent testing). The balls are rounded (rolled into small balls by hand in order to exclude large air bubbles and gas pockets). Each ball is then run through the molder two times using a 5/16 inch setting for the first pass and 3/16 setting for the second. The molded dough is rolled into a cylinder approximately as long as the pan in which it is baked. The cylinder is tightened by placing in the automatic rollers to fit bread pan length between the ends. It is then dropped into greased bread pans, transferred to the proof box and proofed for one hour at 120° F. and 55% relative humidity. The proofed dough is baked at 430° F. for 25 minutes and the resulting bread allowed to cool for one hour. This bread contained the sodium monostearyl fumarate additive at the 0.135% concentration level, based on the total weight of the dough, which amounted to roughly 0.25% based on the flour. Bread is also prepared in an identical manner containing sodium monostearyl fumarate at the 0.270% concentration level (based on dough weight or 0.5% based on flour weight) by merely doubling the amount of additive used previously in the dough batch. Three of the four bread loaves obtained in either case are then packaged into polyethylene bags, and these packaged loaves are stored at room temperature and compression data determined thereon at the end of 3, 4 and 5 days of storage time, respectively. Each of the unpackaged loaves, on the other hand, is sliced and compression determination are performed immediately thereon so as to provide "initial" data readings.

The compression determinations on each loaf are conducted on two-1 inch thick slices of bread, one slice being taken from the center of the bread and the other approximately one inch from the end. The compression test is performed with a standard penetrometer using a 1 inch diameter flat stainless-steel disc in place of the usual Vaseline cone. A 150 g. weight is used as the load on the end of the compression disc. The load is placed on the slice for a period of five seconds, after which time the penetration is determined in tenths of millimeters. Three compressions are porfermed on each slice of bread, two in the bottom corners of the slice and the third at the top center. All data is recorded and the six values for each loaf are averaged. The results obtained in this manner at the two different concentration levels tested (based on flour weight) are presented below in the following table, which also includes corresponding information on the mono-diglyceride additive of commerce (Atmul 500), as well as a negative control (where there is no additive present) for comparison purposes:

| Additive | Level, percent | Initial | Compression data (mm.$^{-1}$) | | |
| --- | --- | --- | --- | --- | --- |
| | | | 3 days | 4 days | 5 days |
| None (control) | | 153 | 32 | 15 | 13 |
| Na monostearyl fumarate | 0.25 | 158 | 55 | 33 | 30 |
| Do | 0.50 | 162 | 60 | 38 | 34 |
| Monodiglyceride [1] | 0.50 | 155 | 45 | 30 | 27 |

[1] Atmul 500, which is the registered trademark name of Atlas Chemical Industries for a mixture consisting of 65% monoglycerides and 35% diglycerides.

From the data presented in the above table, it can be seen that sodium monostearyl fumarate was superior not only to the control, but also to the monodiglyceride of commerce as well at the two different concentration levels tested.

*Example XI*

The procedure described in Example X is followed here except that calcium monostearyl fumarate, prepared as described in Example VIII, is now employed as the softening agent of choice in place of the corresponding sodium salt used in the previous example. The results obtained in this manner are summarized below in the following table, which also includes the same control data as in Example X for comparison purposes:

| Additive | Level, percent | Initial | Compression data (mm.$^{-1}$) | | |
| --- | --- | --- | --- | --- | --- |
| | | | 3 days | 4 days | 5 days |
| None (control) | | 153 | 32 | 15 | 13 |
| Ca monostearyl fumarate | 0.25 | 153 | 31 | 24 | 18 |
| Do | 0.50 | 162 | 56 | 33 | 30 |
| Monodiglyceride | 0.50 | 155 | 45 | 30 | 27 |

As in the previous example, it can be seen that the instant softening agent of choice (in this case, calcium monostearyl fumarate) is superior to the control (i.e., no additive present) at the two different levels tested for the purposes at hand. This is especially true in the case of calcium monostearyl fumarate at the higher concentration level.

*Example XII*

The procedure described in Example X is followed employing in place of sodium monostearyl fumarate as the softening agent of choice any one of the other products reported in Examples VI–VII and IX. In each and every case, the results obtained are substantially the same as those reported previously in the preceding two examples for sodium monostearyl fumarate and calcium monostearyl fumarate, respectively.

*Example XIII*

The procedure described in Example X was repeated again only this time each of the amounts used in the conventional sponge and dough bread formulation were cut exactly in one-half. Further, the dough fermentation temperature was now set at 85–86° F. (~30° C.) after having first been mixed for three and one-quarter minutes instead of for eight minutes. The final baking step was done at 435° F. for 24 minutes. Otherwise, the remainder of the procedure was the same. The results obtained in this manner, using sodium monostearyl fumarate at the 0.5% level, based on flour weight, are summarized below in the following table:

| Additive | Level, percent | Initial | Compression data (mm.$^{-1}$) | | |
| --- | --- | --- | --- | --- | --- |
| | | | 3 days | 4 days | 5 days |
| Na monostearyl fumarate | 0.50 | 180 | 93 | 74 | 56 |
| Monodiglyceride | 0.50 | 179 | 70 | 57 | 46 |

From the data presented in the above table, it is obvious that sodium monostearyl fumarate is superior to mono-diglyceride in retarding the rate of bread firming. At the same time, the subject compound does not increase the initial bread softness, thereby eliminating problems normally associated with slicing and packaging.

*Example XIV*

The procedure described in the preceding example was repeated as regards the preparation of the conventional sponge and dough formulation, including the added sodium monostearyl fumarate at the 0.5% concentration level, based on flour weight. However, in this particular case, the dough improver effects of the aforementioned fumarate compound were investigated and breads were prepared using the optimum mixing time of 3¼ minutes, as well as severe overmix conditions of 6.0 and 7.5 minutes, respectively. Observations were then made on dough quality and on the quality of the finished goods, employing a negative control for comparison purposes. In these tests, three loaves of bread were baked for each test sample or control at a given mixing time for the dough (dough mixing time or DMT, in minutes) and the results then observed were thereafter averaged. The following table summarizes the representative data so obtained under these conditions, using a good quality bread flour (⅓ Montana, ⅔ Kansas Spring, 65% absorption) for all of these studies:

| Additive | DMT (min.) | Loaf, wght. (gm.) | Loaf, vol. (cc.) | Sp. vol., cc./gm. | Bread appearance and dough effects |
|---|---|---|---|---|---|
| None (control) | 3.25 | 401 | 2,125 | 5.30 | Fair crumb and open-grained texture. |
| Na monostearyl fumarate | 3.25 | 403 | 2,170 | 5.38 | Good crumb and dough handling. |
| None (control) | 6.0 | 404 | 2,060 | 5.10 | Fair crumb; dough very sticky at makeup. |
| Na monostearyl fumarate | 6.0 | 404 | 2,105 | 5.20 | Fairly good crumb; dough significantly less sticky. |
| None (control) | 7.5 | 404 | 2,085 | 5.16 | Poor crumb and coarse texture; dough v. sticky. |
| Na monostearyl fumarate | 7.5 | 403 | 2,155 | 5.35 | Fair crumb; dough significantly less sticky at makeup. |

From the above table, it is obvious that sodium monostearyl fumarate gives consistently superior results as compared to the negative control where there is no additive present, as regards the grain and overall bread quality. Further, the doughs produced on overmixing, in the case of the instant fumarate-containing compositions, are stronger and substantially less runny and sticky on makeup and consequently, they are easier to process.

Example XV

The procedure described in Example XIV was repeated only this time a higher baking temperature with a shorter baking time was employed, viz., a baking temperature of 500° F. for 18 minutes instead of at 435° F. for 24 minutes. The results obtained in this manner, at two different mixing times (optimum and overmix), are summarized below in the following table:

| Additive | DMT (min.) | Loaf, wght. (gm.) | Loaf, vol. (cc.) | Sp. vol., cc./gm. | Bread appearance and dough effects |
|---|---|---|---|---|---|
| None (control) | 3.25 | 400 | 2,180 | 5.45 | Fairly good crumb, but a somewhat open-grained texture. |
| Na monostearyl fumarate | 3.25 | 401 | 2,205 | 5.50 | Good crumb texture and dough handling. |
| None (control) | 7.5 | 406 | 2,020 | 4.97 | Poor crumb and open-grained coarse texture; dough very sticky and runny at makeup. |
| Na monostearyl fumarate | 7.5 | 404 | 2,150 | 5.32 | Fair crumb; dough significantly less runny and sticky at makeup. |

Example XVI

The procedure described in Example XIV was repeated only this time a shorter proof time was employed, viz., 140° F. for 45 minutes instead of at 120° F. for one hour. The results obtained in this manner are summarized below in the following table, where a comparison is given with the monodiglyceride of commerce:

| Additive | DMT (min.) | Loaf, wght. (gm.) | Loaf, vol. (cc.) | Sp. vol., cc./gm. | Bread appearance and dough effects |
|---|---|---|---|---|---|
| Na monostearyl fumarate | 3.25 | 398 | 2,095 | 5.26 | Good crumb and dough handling. |
| Monodiglyceride | 3.25 | 399 | 2,120 | 5.32 | Do. |
| Na monostearyl fumarate | 7.5 | 403 | 1,965 | 4.87 | Fair crumb; dough slightly sticky. |
| Monodiglyceride | 7.5 | 402 | 2,005 | 4.99 | Fair crumb; dough very sticky. |

Example XVII

The procedure described in Example XIV was repeated only this time a longer fermentation time and a higher temperature were employed, viz., 5 hours at 35–36° F. for the sponge instead of for four hours at room temperature. The results obtained in this manner are summarized below in the following table:

| Additive | DMT (min.) | Loaf, wght. (gm.) | Loaf, vol. (cc.) | Sp. vol., cc./gm. | Bread appearance and dough effects |
|---|---|---|---|---|---|
| None (control) | 3.25 | 398 | 2,160 | 5.42 | Fairly good crumb and dough handling but not very close-grained. |
| Na monostearyl fumarate | 3.25 | 401 | 2,140 | 5.33 | Good crumb and dough handling; very close-grained texture. |

Example XVIII

The procedures described in Examples XIV–XVII are repeated using the other fumarate or maleate compounds that were reported previously in Examples VI–IX. In each and every case, the results obtained showed that the other compounds of this invention work substantially as well as dough improving agents when compared to sodium monostearyl fumarate in this respect.

*Example XIX*

Sodium monostearyl fumarate, prepared as described in Example V, was used as a softener and dough improver in sweet dough by incorporating it into a cake recipe typical of coffee cake, i.e., a lean sweet dough formula, having the following composition:

| | Grams |
|---|---|
| Bread flour | 624 |
| Cake flour | 176 |
| Sugar | 80 |
| Salt | 14 |
| Covo [1] | 80 |
| Milk | 16 |
| Whole eggs | 40 |
| Yeast | 48 |
| Water | 464 |

[1] Covo is the registered trademark name of the Procter & Gamble Co. for a plastic all-purpose vegetable shortening agent.

The sugar, milk, shortening agent and salt were all mixed together first in a stainless-steel bowl container at a low speed for about five minutes to form a cream. The cream was then next mixed at a medium speed, while the whole eggs were added slowly and mixing was continued at this rate for about five minutes thereafter. At this point, water and yeast were added while slowly mixing all the ingredients, followed by the flour components of the formula. The resultant composition was then finally mixed on speed No. 2 until it was thoroughly blended or developed, and this required a time period of about eight minutes in order to effect same. The final steps were similar to the aforementioned procedures employed in the case of bread, except that the following specific conditions were employed: Fermentation time, 1 hr. and 45 minutes at 80° F. (dough temp.); proofing done at 100° F. for 55 minutes, and baking at 375° F. for 31 minutes after a 15 oz. scale-up. The softening effects shown here by sodium monostearyl fumarate at a 0.5% level, based on the flour, are presented below in the following table, using the monodiglyceride of commerce on the same weight level for comparison purposes:

| Additive | Level, percent | Initial | Compression Data (mm.$^{-1}$) | |
|---|---|---|---|---|
| | | | 1 day | 4 days |
| Na monostearyl fumarate | 0.50 | 195 | 164 | 92 |
| Monodiglyceride | 0.50 | 191 | 142 | 62 |

The dough improver data obtained in the present instance (after the 31-minute baking period) are listed below as follows:

| Additive | Cake, wght. (gm.) | Cake, vol. (cc.) | Sp. vol., cc./gm. | Cake appearance and dough effects |
|---|---|---|---|---|
| Na monostearyl fumarate | 371 | 2,430 | 6.54 | Excellent crumb; good dough handling. |
| Monodiglyceride | 371 | 2,390 | 6.44 | Good crumb and dough handling. |

*Example XX*

The procedure described in the preceding example was repeated, with comparable results being obtained, using a rich sweet dough formula instead, whereby the amount of sugar employed therein was doubled that of Example XIX and the amount of milk, whole eggs, yeast and water were respectively 48, 160, 80, and 360 grams. Further, the final mixing step was conducted for twelve minutes instead of for eight minutes, the fermentation time was for two hours and the proofing step required 65 minutes. It was found that the crumb characteristics in the case of the cake containing the sodium monostearyl fumarate were excellent, whereas those of the monodiglyceride-containing cake were only fair, although dough handling was good in both instances.

*Example XXI*

The procedure described in Example XIX was followed except that a negative control was employed wherein there was no additive present. Further, the final mixing step was run for 16 minutes instead of for eight minutes. The results obtained in this manner, as regards the softening effect, are present below in the table as follows:

| Additive | Level, percent | Initial | Compression Data (mm.$^{-1}$) | |
|---|---|---|---|---|
| | | | 2 days | 4 days |
| None (control) | | 188 | 60 | 36 |
| Na monostearyl fumarate | 0.50 | 188 | 112 | 78 |

The dough improver data obtained in the present instance are listed below as follows:

| Additive | Loaf, wght. (gm.) | Loaf, vol. (cc.) | Sp. vol., cc./gm. | Bread appearance and dough effects |
|---|---|---|---|---|
| None (Control) | 375 | 2,150 | 5.72 | Slightly poor crumb; fair dough handling. |
| Na monostearyl fumarate | 374 | 2,350 | 6.20 | Excellent crumb; good dough handling. |

*Example XXII*

The procedure described in Example XIX is followed using the other fumarate and maleate compounds described previously in Examples VI–IX. In each and every case, the results obtained are substantially the same as those reported previously with sodium monostearyl fumarate as regards both the softening effect and the dough improver qualities in the yeast leavened sweet dough.

Additionally, the procedure described in Example XIX is repeated using the compounds of choice at different concentration levels other than those previously employed. For instance, when sodium monostearyl fumarate is employed at the 0.1% concentration level, based on the weight of the flour, the results obtained are substantially the same as those previously reported. In like manner, the use of 2.0% sodium monotetradecyl fumarate also affords similar results.

*Example XXIII*

Eight grams of corn (maize) starch derived from a cereal grain and 200 ml. of water were mixed together in the following manner: a small amount of water was first added to the dry material sufficient to make a paste and then the remainder of the water was added to the paste followed by the subsequent heating of the mixture to the boiling point. After boiling for one-half minute and then allowing the mixture to stand overnight for about 16 hours at ambient temperatures, there was obtained a semi-solid gel. When the aforementioned test was repeated again only this time using 0.16 g. (2.0%) of sodium monostearyl fumarate together with the corn starch in a dry mixture, there was obtained a fluid material having the approximate consistency of unbeaten egg white. Additionally, the fluid material had almost no surface skin on top, unlike the control which did have a heavy surface skin or film in this area.

After holding both samples in hot water for one hour, the control had completely gelled while the sample containing the sodium monostearyl fumarate was still a fluid liquid. The latter was then boiled for ten minutes and although it became somewhat slightly thicker (due to water evaporation), it still did not form a gel.

Example XXIV

The procedure described in the previous example is repeated using the other fumarate and maleate compounds described in Examples VI–IX. In each and every case, the results obtained are substantially the same as those reported in Example XXIII for sodium monostearyl fumarate at the 2.0% level.

In like manner, the use of sodium monostearyl fumarate at the 0.1% concentration level based on the weight of the starch, and at the 4.0% concentration level also affords similar results, as does any of the compounds listed in Examples VI–IX like sodium monocetyl fumarate and sodium monotetradecyl fumarate, for instance.

Example XXV

The procedure described in Examples XXIII and XXIV is followed using other starches in place of corn starch. For instance, the following starches have been found applicable under the present circumstances: wheat starch, rice starch, oat starch and barley starch. In each instance, the results obtained are similar to those reported in Examples XXIII and XXIV.

Example XXVI

Macaroni noodles were prepared in the manner hereinafter indicated from the following recipe: One whole egg, ½ teaspoon of salt, 2 tablespoons of milk and one cup of sifted all-purpose flour. The egg, salt and milk were first mixed together, and the flour was then added to the mixture to produce a thick dough. This dough mixture was then rolled very thin and allowed to stand for twenty minutes. It was then rolled loosely, cut into ¼" slices, unrolled and allowed to dry for two hours at room temperature (~25° C.).

The foregoing procedure was then repeated using sodium monostearyl fumarate at the 2% concentration level, based on the flour, the organic compound being added to the mixture via the milk component which was first warmed.

Both samples were then cooked by placing 45.4 g. of each noodle sample into 576 ml. of boiling water containing 3.6 g. of salt. The noodles were cooked for ten minutes, then drained and placed on a steam bath. It was noted at this point that the sample containing sodium monostearyl fumarate was much firmer and less sticky than the control sample. After four hours treatment on the steam bath, the sodium monostearyl fumarate sample became still much firmer than initially, more moist looking than the control and the noodles didn't stick together at all, whereas the control sample had become very dry and the noodles did stick together, being almost inseparable from one another in some instances.

When the above experiment was repeated using sodium monostearyl fumarate at the 1% concentration level, substantially the same results were obtained, i.e., after cooking and then remaining on the steam bath for four hours, the treated noodles were still far superior to the controls. The same results were also obtained when 0.5% sodium monostearyl fumarate was used instead.

Example XXVII

The procedure described in Example XXVI is repeated with spaghetti instead of noodles as the alimentary paste product of choice and similar results are obtained. In like manner, substantially the same results are also obtained using macaroni in place of noodles.

Additionally, the use of sodium monostearyl fumarate at the 0.1% level and sodium monotetradecyl fumarate at the 4% level affords similar results when employed in this same procedure.

Example XXVIII 200 grams of rice in 480 ml. of cold water containing 5 g. of salt and 15 g. of butter were cooked in the following manner: The ingredients were first mixed, then brought to a boil and simmered under cover for twenty minutes. The procedure was then repeated only this time using rice coated with sodium monostearyl fumarate at a 4 g. (2%) level. It was found that in the case of the sodium monostearyl fumarate treated rice, the particles were fluffier and drier in appearance and that they did not stick together to the extent that they did in the control. The latter particles, on the other hand, stuck together and, in addition, they presented a wet, sticky appearance to the eye. After overnight refrigeration of both samples, the organic compound treated rice was still found to be more drier and less "clumped" in appearance than the control; it also could be more easily broken up into separate particles than the control.

When the above procedure is repeated with sodium monostearyl fumarate at the 4% level, similar results are obtained. In like manner, sodium monostearyl fumarate at the 0.1% level also produces some effect, i.e., the stickiness of the rice particles is reduced.

Example XXIX

A number of varieties of rice (short, medium and long grain) were coated with sodium stearyl fumarate by drytumbling until no free fumarate ester was visible. Levels of addition ranged from 0.5 to 4%. The finished cooked rices, when compared with a negative control, showed reduced or eliminated surface slime and surface sticking. The longer grain rice varieties require less additive than did the shorter grain rice to achieve the desired result.

Example XXX

Pearl barley was dry-blended with levels of 0.5 and 1% sodium stearyl fumarate. The barley was then cooked into an edible cereal consistency along with a negative control. Evaluation of the finished cereals showed that sodium stearyl fumarate retarded pasting and the development of surface skin. The cereal was more even textured and was not pasty.

Example XXXI

The required portions of cold water (2½ cups), Wheatena (½ cup), salt (½ teaspoon) and a quantity of sodium monostearyl fumarate (0.4 g.) equal to about 0.5% by weight of the dry cereal (79 g.) were blended together to form a test batch. ("Wheatena" is the trademark name of the Wheatena Corp. for a cereal derived from wheat grain.) This batch was heated slowly with stirring to the boiling point of the mixture and then subsequently cooked at that point for seven minutes. The procedure was repeated again only this time with a control batch wherein no sodium monostearyl fumarate was present in the mixture. It was found that whereas the cereal particles in the control were soft and pasty, those in the treated portions had a definite shape and were not clumped together. As a matter of fact, compared to the control, the treated cereal had larger granules, was lighter in appearance, had more body and was less pasty to the taste. Further, there was skin formation on the surface of the cooked cereal, unlike the control, and there was no free water present in the final mixture of the cooked product.

Example XXXII

The procedure described in Example XXXI is repeated using oatmeal as the cereal of choice in place of Wheatena and achieving similar results. In like manner, a farina cereal ("Cream of Wheat," National Biscuit Co.) also behaves in a similar fashion when subjected to this same procedure.

Additionally, the procedure described in Example XXXI is followed using sodium monostearyl fumarate at 0.1% and 4% concentration levels, respectively. In each case, comparable results to those reported in Example XXXI are obtained.

Example XXXIII

A 5% paste of corn starch (5 g. in sufficient water to total 100 g. of mixture) was prepared having a maximum viscosity reading of 130 B.U. (Brabender Units) at 95° C. when tested in a Brabender Visco Amylograph for these purposes. On holding the paste at 95° C. for twenty minutes and subsequently cooling down to room temperature (~25° C.), there was obtained a solid plastic gel.

When these two steps were repeated with a similar starch paste but one containing 2% sodium monostearyl fumarate, based on the weight of the corn starch, added at the point of maximum viscosity of the control, there was obtained a product having a maximum viscosity reading of 160 B.U. at 95° C. When this paste containing the added organic compound was cooled down to room temperature after having been held at 95° C. for a twenty minute period, there was obtained a fluid dispersion (200 B.U. at 25° C.) which poured readily. Upon evaporation of this dispersion to dryness while under reduced pressure, there was obtained an amorphous material which could be reconstituted to its original consistency by warming to 50° C.

1% sodium monostearyl fumarate, under the same circumstances, also gave similar results although the cooled paste containing same was somewhat more viscous than the finished product discussed above. Nevertheless, it was far superior to the control in this respect and, in addition, it could still be poured with only slight difficulty.

Example XXXIV

A corn starch paste (~8%) was prepared by blending 40 g. of said material (which is actually derived from a cereal grain) with 450 g. of water. When 2% sodium monostearyl fumarate, based on the weight of the starch, was added to the initial starch paste mixture at room temperature (25° C.) and heated to 95° C., there was obtained a noticeable inhibition of granule swelling over the control. The effect of adding 2% sodium monostearyl fumarate to the paste at the temperature of maximum viscosity (92.5° C.), however, resulted in an increase in viscosity over that of the control which amounted to about 330 Brabender Units (B.U.) at the end of the run (twenty minutes at 92.5° C.).

Example XXXV

The procedure described in the previous two examples was repeated with rice starch (also derived from a cereal grain) instead of corn starch. The viscosity changes obtained in this instance were similar to those reported previously in Examples XXXIII–XXXIV.

Example XXXVI

The procedure described in Examples XXXIII–XXXIV was repeated only this time using wheat starch as the substrate of choice. The gelation inhibition with 10% wheat starch (50 g. in 450 g. of water) at three different sodium monostearyl fumarate levels, based on starch weight, was studied. At the 2% level, it was found that the viscosity of the treated initial starch paste at room temperature did not increase (no swelling of starch granules), even after holding at 95° C. for more than one hour. 1% sodium monostearyl fumarate, on the other hand, caused no swelling of starch granules to occur until a temperature of 95° C. was reached and after holding at that point for 20 minutes, the viscosity increased to 180 B.U. With 5% sodium monostearyl fumarate, the viscosity was stabilized at 520–540 B.U. during the holding period at 95° C., although starch granule swelling was inhibited before that point.

When sodium monostearyl fumarate was added to a 10% wheat starch paste at 0.5, 1.0 and 2.0% levels at the temperature of maximum viscosity, the viscosity was found to increase in every instance. This increase was also found to be proportional to the organic compound concentration within this range. For instance, with 2% sodium monostearyl fumarate added in this manner, the viscosity increased by 1000 B.U. after two minutes, and was 750 B.U. higher than the control maximum after 20 minutes.

Example XXXVII

The procedure described in the previous example was followed to compare the effect of increasing the weight of wheat starch levels while maintaining the sodium monostearyl fumarate concentration constant at the 2% level, based on the weight of the starch present. It was found that with an 11.8% starch concentration (60 g. in 450 g. water), granule swelling was still drastically inhibited although some increase in the viscosity was noted after 60 minutes at 95° C. In the case of wheat starch at the 13.4% concentration level (70 g.), granule swelling was still inhibited and the decrease in viscosity as compared to the control was still significant. At a 15.1% concentration of wheat starch (80 g.), swelling was restricted to a significant degree although the viscosity increased quite rapidly on holding at 95° C. for a slightly prolonged period of time.

Example XXXVIII

The procedure described in Examples XXXIII–XXXVII is repeated using the other fumarate and maleate compounds described previously in Examples VI–IX. In each and every case, the results obtained are substantially the same as those reported previously for sodium monostearyl fumarate as regards both the fluid dispersion (gelation inhibition) and starch thickening effect achieved with the starch-based compositions.

Additionally, these effects have also been achieved with the compounds of choice at concentration levels as low as 0.1%, based on the weight of the starch. In this respect, sodium monostearyl fumarate, calcium monostearyl fumarate, sodium monostearyl maleate, sodium monocetyl fumarate and sodium and potassium monotetradecyl maleate have all been found to be particularly effective. Furthermore, the starch compositions prepared by using these compounds at the aforementioned levels have all been found to be effective for use as industrial adhesive agents.

Example XXXIX

The gluten fraction of wheat flour was separated from the starch fraction by means of a standard dough-washing procedure [see M. J. Wolf in "Methods in Carbohydrate Chemistry," vol. IV, p. 6, edited by R. L. Whistler, Academic Press, New York (1964)]. The gluten obtained from the dough was then examined and compared with that obtained from 1% sodium monostearyl fumarate (percentage based on flour) treated dough. In this manner, it was found that the gluten from the treated dough was more cohesive and resisted extension to a considerably greater degree than did the gluten obtained from the control dough. As a result, the strength of a moisture-containing wheat cereal flour composition is considerably enhanced by the use of sodium monostearyl fumarate due to the effect of this organic compound on the gluten fraction contained therein, i.e., dough improver properties result, caused in large part by the marked increase in strength of the gluten fraction as hereinbefore described.

Example XL

The procedure described in Example XXXIII was repeated using rice flour paste (~8% concentration) as the substrate of choice. It was found that a markedly significant degree of granule swelling inhibition occurred when 2% sodium monostearyl fumarate (percentage based on flour) was used as compared to the control, as evidenced by the lower viscosities obtained throughout the Brabender Visco Amylograph run. The effects obtained with rice flour here are quite similar to those obtained rice starch, as reported elsewhere in the specification.

Tapioca flour was also tested in this manner and found to behave in a similar fashion when sodium monostearyl fumarate was added at the 2% level to a 6.25% paste at room temperature or at the temperature of maximum viscosity of the control.

Example XLI

The procedure described in Example XXXIX is repeated using the other fumarate and maleate compounds described previously in Examples VI–IX. In each and every case, the results obtained are substantially the same as those reported previously with sodium monostearyl fumarate as regards the gluten-strengthening effect in moisture-containing cereal flour compositions.

In like manner, the use of any of these compounds at concentration levels ranging from 0.1% to 2% by weight, based on the flour, affords similar results. For instance, sodium monostearyl fumarate at the 0.1% level, sodium monostearyl maleate at the 0.5% level and sodium monocetyl fumarate at the 2% level have all been found to be effective.

Example XLII

A high-sugar white cake was prepared in the following manner from the ingredients listed below:

|  | Grams |
| --- | --- |
| Cake flour | 219 |
| Sugar | 291 |
| Baking powder [1] | 14 |
| Salt | 7 |
| Milk solids (non-fat) | 15.6 |
| Covo [2] | 100 |
| Egg whites | 113 |
| Water | 202 |

[1] Standard baking powder was used here, i.e., of the double action variety comprising corn starch, sodium bicarbonate, calcium acid phosphate and sodium aluminum sulfate.
[2] Covo is the registered trademark name of the Procter & Gamble Co. for a plastic all-purpose vegetable shortening agent.

The first five ingredients in the above list were blended together for three minutes at the No. 1 speed in a Hobart Kitchenaid Mixer. This was then followed by the addition of the shortening, egg whites and water to the mix in one batch followed by the agitation of the whole at No. 2 speed for 1.5 minutes, stopping only after each half-minute to scrape down the bowl. The batter was then checked for specific gravity and 425 grams of same was then scaled into an 8 inch round cake pan. The baking was done at 375° F. for twenty-six minutes. This entire procedure was then repeated again using sodium monostearyl fumarate at both the 0.5% and 1% concentration levels, based on flour weight. The sodium monostearyl fumarate was dry-blended with the cake flour at the start of the procedure in each instance.

Example XLIII

Sodium monostearyl fumarate was added to potato mash at a concentration level of 0.25% based on the weight of the dry solids present in the mixture. It was found that this step served to facilitate drying into granule form, as compared to the control, by retarding the amount of starch gelation. This, in turn, facilitated release from the dryer. The reconstituted potato granules were then found to be not stiff and pasty, and they had a rapid release in the mouth. Sodium monostearyl fumarate at the 0.5% level also produced the same effect.

Example XLIV

Eighty grams (80 g.) of unmodified corn starch was uniformly dispersed in cold water and the resulting mixture adjusted to an 8% (w./w.) concentration level. It was then heated to 95° C. on a steam bath and after heating for twenty minutes at that point, 1.6 g. of sodium monostearyl fumarate (2% based on the starch) dissolved in a minimum amount of hot water, was added to the mixture uniformly. The resulting starch paste was then heated at 95° C. for an additional ten minutes. A portion of this paste was then withdrawn and used to caste a film. The film was allowed to dry at 70° F. and 50% relative humidity. It was found on close examination that this film was considerably more transparent and pliable and more readily soluble in most solvents than a similar film prepared in exactly the same manner, but lacking the added organic compound.

Example XLV

The procedure described in Example XLIV is repeated using the other fumarate and maleate compounds described in Examples VI–IX. In each and every case, the results obtained are substantially the same as those reported previously with sodium monostearyl fumarate as regards the film-forming effect.

Additionally, this same effect is also achieved when all these compounds are individually employed at a concentration level of 0.1% instead of at 2% as in the preceding example.

Example XLVI

The procedure described in Example XLIV to prepare the starch pastes is repeated only this time the pastes were allowed to cool to room temperature (70° F.) and used to glue two strips (1″ x 4″) of kraft paper together by coating them with same at their 1″ x 1″ center portion. It was noted that the starch paste containing the sodium monostearyl fumarate was easier to apply and gave a smoother, more uniform coating than did the control paste. Furthermore, upon prolonged storage, the control paste underwent retrogradation and weeping, whereas the starch paste of this example remained smooth and uniform.

Example XLVII

The starch pastes prepared in Example XLIV were used to size cotton yarn at 190° F. It was noted that the starch paste containing sodium monostearyl fumarate gave a more uniform coating and a more acceptable set of weaving efficiencies than did the control. Furthermore, it was also more stable as a solution during the application step and showed no signs of skinning as did the control. The viscosity of the instant sizing composition also remained constant throughout the entire operation.

What is claimed is:

1. The method of reducing stickiness of moisture-containing cereal grain which comprises incorporating therein from about 0.1 to 4% by weight based on said grain of a substance selected from the group consisting of the sodium, potassium, calcium and magnesium salts of monoalkyl fumarates wherein the alkyl group contains from 16 to 18 carbon atoms.

2. A cereal grain having incorporated therein from about 0.1% to about 4% by weight based on said grain of a substance selected from the group consisting of the sodium, potassium, calcium and magnesium salts of monoalkyl fumarates wherein the alkyl group contains from 16 to carbon atoms.

3. The composition of claim 2 wherein said grain is wheat.

4. The composition of claim 2 wherein said grain is rice.

5. The composition of claim 2 wherein said grain is maize.

6. The composition of claim 2 wherein said grain is oats.

7. The composition of claim 2 wherein said grain is barley.

8. A breakfast cereal having incorporated therein from about 0.1% to about 4% by weight based on said cereal of a substance selected from the group consisting of the sodium, potassium, calcium and magnesium salts of monoalkyl fumarates wherein the alkyl group contains from 16 to 18 carbon atoms.

9. An alimentary paste product having incorporated therein from about 0.1% to about 4% by weight based on said paste of a substance selected from the group consisting of the sodium, potassium, calcium and magnesium salts of monoalkyl fumarates wherein the alkyl group contains from 16 to 18 carbon atoms.

10. The composition of claim 9 wherein said paste product is macaroni.

11. The composition of claim 9 wherein said paste product is spaghetti.

12. The composition of claim 9 wherein said paste product is noodles.

13. A food composition selected from the group consisting of cereal grains, breakfast cereals and alimentary paste products having incorporated therein from about 0.1% to about 4% by weight based on said composition of a substance selected from the group consisting of the sodium, potassium, calcium and magnesium salts of monoalkyl fumarates and maleates containing from about 14 to 18 carbon atoms in the alkyl group.

References Cited

UNITED STATES PATENTS

| | | | |
|---|---|---|---|
| 2,552,706 | 5/1951 | Betram | 99—123 X |
| 2,728,683 | 2/1955 | Hervert | 106—210 |
| 2,859,113 | 11/1958 | Goodfriend | 99—1 |
| 3,022,184 | 2/1962 | Kerr | 106—210 |
| 3,023,104 | 2/1962 | Battista | 99—1 |
| 3,113,869 | 12/1963 | Lee | 99—85 |
| 3,145,109 | 8/1964 | Howard | 99—118 |

FOREIGN PATENTS

| | | |
|---|---|---|
| 561,704 | 8/1958 | Canada. |
| 652,006 | 4/1951 | Great Britain. |

RAYMOND N. JONES, *Primary Examiner.*

A. LOUIS MONACELL, *Examiner.*